United States Patent
Saito et al.

(10) Patent No.: US 8,953,424 B2
(45) Date of Patent: Feb. 10, 2015

(54) OPTICAL RECORDING MEDIUM DRIVING APPARATUS, AND METHOD OF GENERATING TRACKING ERROR SIGNAL

(75) Inventors: Kimihiro Saito, Kanagawa (JP); Noriaki Nishi, Kanagawa (JP)

(73) Assignee: SonyCorporation, Tokyo (JP)

( * ) Notice: Subject to any disclaimer, the term of this patent is extended or adjusted under 35 U.S.C. 154(b) by 0 days.

(21) Appl. No.: 13/485,144

(22) Filed: May 31, 2012

(65) Prior Publication Data

US 2012/0320721 A1    Dec. 20, 2012

(30) Foreign Application Priority Data

Jun. 16, 2011   (JP) .................................. 2011-134013
Mar. 21, 2012   (JP) .................................. 2012-063363

(51) Int. Cl.
*G11B 7/00*        (2006.01)
*G11B 7/09*        (2006.01)

(52) U.S. Cl.
CPC .................................... *G11B 7/0903* (2013.01)
USPC .................................... 369/44.41; 369/44.37

(58) Field of Classification Search
None
See application file for complete search history.

(56) References Cited

U.S. PATENT DOCUMENTS

| 5,544,141 | A * | 8/1996 | Kawasaki .................. 369/47.17 |
| 6,091,679 | A * | 7/2000 | Kuribayashi et al. ...... 369/44.27 |
| 2003/0112723 | A1* | 6/2003 | Ceshkovsky ............... 369/44.37 |
| 2004/0264313 | A1* | 12/2004 | Nagara et al. .............. 369/44.32 |

FOREIGN PATENT DOCUMENTS

| JP | 06274905 A * | 9/1994 | ............... G11B 7/09 |
| JP | 2000-207766 | 7/2000 | |

* cited by examiner

*Primary Examiner* — Wayne Young
*Assistant Examiner* — Mark Fischer
(74) *Attorney, Agent, or Firm* — Sony Corporation

(57) ABSTRACT

An optical-recording-medium driving apparatus includes: a light irradiating/receiving section configured to irradiate light on a medium so as to form a first side spot, a main spot, and a second side spot, and to receive reflection light from the individual spots; a first delay section configured to delay a light reception signal on the first side spot in accordance with a disposition interval between the first and the second side spots; a second delay section configured to delay a light reception signal on the main spot in accordance with a disposition interval between the main and second side spots; and a tracking-error-signal generation section configured to generate a tracking error signal on the basis of a correlation between delayed light reception signals on the first side spot and the main spot, and a correlation between the light reception signals on the second side spot and the main spot.

6 Claims, 8 Drawing Sheets

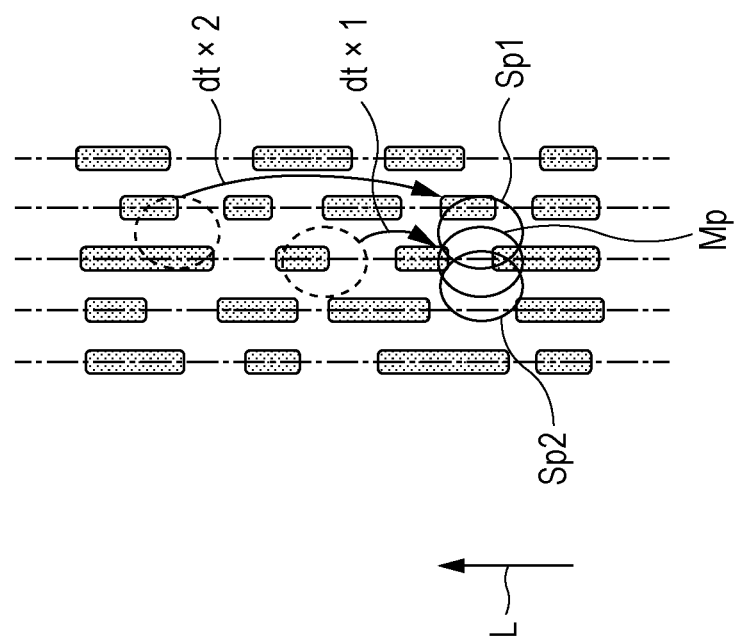

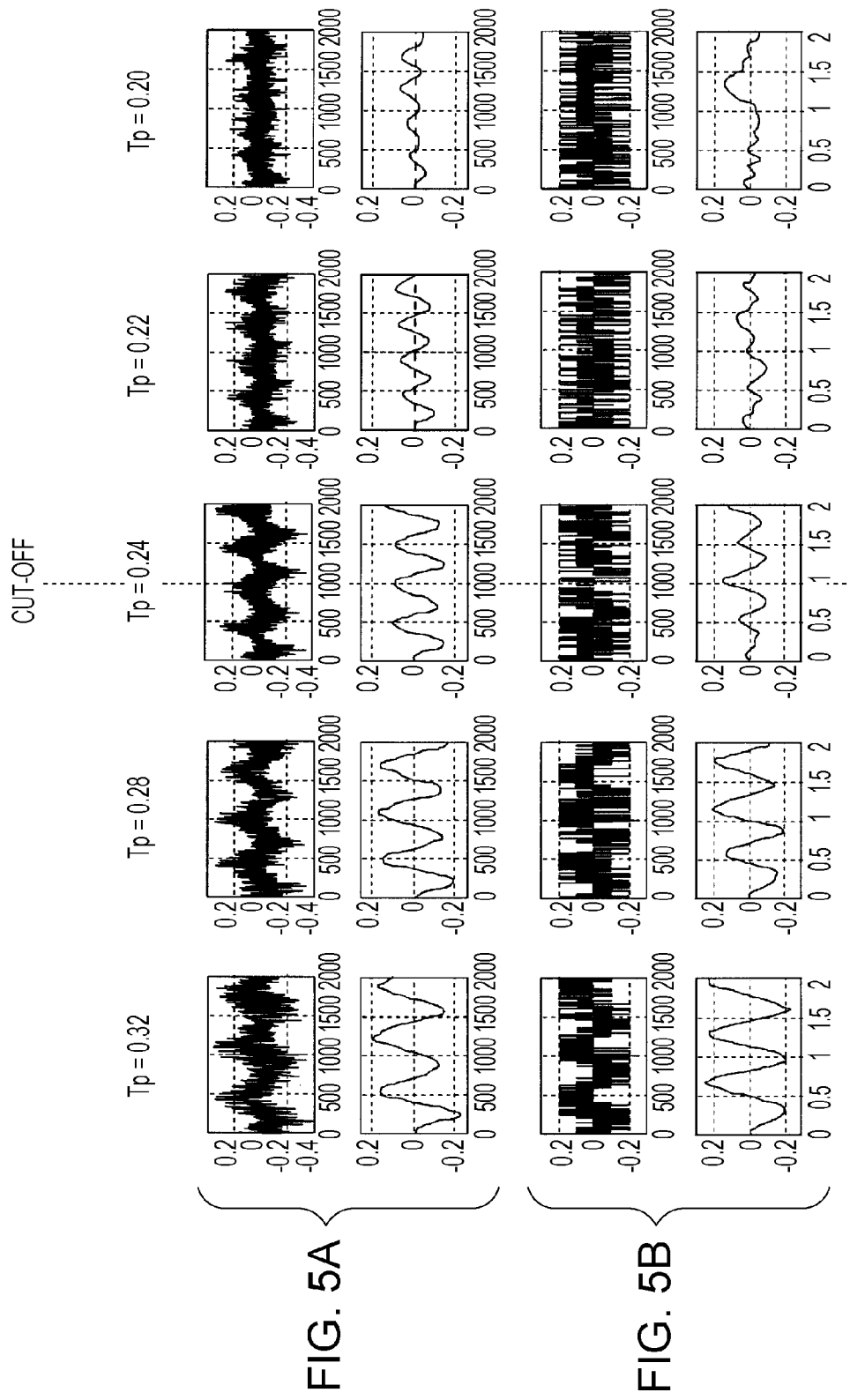

OPTICAL RECORDING MEDIUM DRIVING APPARATUS, AND METHOD OF GENERATING TRACKING ERROR SIGNAL

CROSS REFERENCES TO RELATED APPLICATIONS

The present application claims priority to Japanese Priority Patent Application JP 2011-134013 filed in the Japan Patent Office on Jun. 16, 2011, and Japanese Priority Patent Application JP 2012-063363 filed in the Japan Patent Office on Mar. 21, 2012, the entire contents of which are hereby incorporated by reference.

BACKGROUND

The present disclosure relates to an optical-recording-medium driving apparatus that performs at least playback of an optical recording medium, and a method of generating a tracking error signal thereof.

A related-art technique has been disclosed in Japanese Unexamined Patent Application Publication No. 2000-207766, for example.

Optical disc recording media (hereinafter referred to as optical discs), for example, such as a CD (Compact Disc), a DVD (Digital Versatile Disc), a BD (Blu-ray Disc: registered trademark), etc., have become widespread.

In optical disc drives that performs recording and playback on these optical discs, tracking-servo control is carried out in order to follow eccentricity and disturbance, etc., of the optical discs. To date, as a method of detecting a tracking error, for example, a push-pull method, a three-spot method, a DPD (Differential Phase Detection) method, etc., have been familiar.

SUMMARY

However, depending on a related-art method of detecting a tracking error, it becomes very difficult to suitably detect a tracking error on the condition that a track pitch is equal to or less than $\lambda/NA/2$ ($\lambda$=recording/reproducing wavelength, NA=objective–lens numerical aperture). That is to say, when a track pitch is set to a value less than a theoretical resolution limitation, it becomes very difficult to achieve tracking servo control.

The present disclosure has been made in view of these problems. It is desirable to provide a configuration capable of performing tracking servo control easily and at low cost even if a track pitch is set to a value less than a theoretical resolution limitation.

According to an embodiment of the present disclosure, there is provided an optical-recording-medium driving apparatus including:

a light irradiating/receiving section configured to irradiate light on an optical recording medium so as to form a first side spot, a main spot, and a second side spot disposed in a positional relationship individually shifted both in a tracking direction and a line direction of the optical recording medium, and to receive reflection light from the optical recording medium individually on each of the spots;

a first delay section configured to delay a light reception signal on the first side spot, obtained by the light irradiating/receiving section, for a time period in accordance with a disposition interval between the first side spot and the second side spot in the line direction;

a second delay section configured to delay a light reception signal on the main spot, obtained by the light irradiating/receiving section, for a time period in accordance with a disposition interval between the main spot and the second side spot in the line direction; and a tracking-error-signal generation section configured to generate a tracking error signal on the basis of a correlation between a light reception signal delayed by the first delay section on the first side spot and a light reception signal delayed by the second delay section on the main spot, and a correlation between a light reception signal on the second side spot, obtained by the light irradiating/receiving section, and a light reception signal delayed by the second delay section on the main spot.

As described above, in the present disclosure, light reception signals from the first side spot and the main spot are delayed for time periods in accordance with line-direction intervals with respect to the second side spot, respectively. And a tracking error signal is generated on the basis of correlations between the light reception signals (readout signals) for each pair of the first side spot and the main spot, and for each pair of the second side spot and the main spot, respectively.

Here, for example, if detrack occurs to a side on which the first side spot is disposed, the first side spot becomes apart from a readout-target track by the main spot (that is to say, a servo-target track). On the contrary, the second side spot becomes close to the servo-target track. Accordingly, in this case, a correlation between the light reception signals of the pair of the first side spot and the main spot becomes low. On the contrary, a correlation between the light reception signals of the pair of the second side spot and the main spot becomes high.

On the other hand, if detrack occurs to a side on which the second side spot is disposed, the first side spot becomes close to the servo-target track, and the second side spot becomes apart from the servo-target track. Accordingly, in this case, a correlation between the light reception signals of the pair of the first side spot and the main spot becomes high, and a correlation between the light reception signals of the pair of the second side spot and the main spot becomes low.

As is understood from the above, it is possible to obtain a tracking error signal on the basis of the correlation between the light reception signals of the pair of the first side spot and the main spot, and the correlation between the light reception signals of the pair of the second side spot and the main spot.

By the above-described disclosure that generates a tracking error signal on the basis of "a correlation between the light reception signals of a pair of a first side spot and a main spot" and "a correlation between the light reception signals of a pair of a second side spot and a main spot", it is possible to properly detect a tracking error even in the case where a track pitch is less than a theoretical resolution limitation.

And in order to generate a tracking error signal by a method of generating a tracking error signal, according to the present disclosure described above, it is necessary to include at least a configuration to generate individual side spots together with a main spot, and to receive light reception signals individually, and a configuration to calculate correlations between the individual light reception signals (ought to be the basic four arithmetic operations, such as subtraction, multiplication, etc.). That is to say, it is not necessary to have a special optical system and complicated calculations. Accordingly, it is possible to provide tracking servo control by an easy and inexpensive configuration even if a track pitch is set to a value less than a theoretical resolution limitation.

By the present disclosure, it is possible to provide a configuration capable of performing tracking servo control easily and at low cost even if a track pitch is set to a value less than a theoretical resolution limitation.

Additional features and advantages are described herein, and will be apparent from the following Detailed Description and the figures.

BRIEF DESCRIPTION OF THE FIGURES

FIG. 4 is an explanatory diagram on effect by delay;

FIGS. 5A and 5B are diagrams illustrating tracking error signals according to the present embodiment and a DPD method, respectively, by comparing waveforms obtained for each track pitch.

DETAILED DESCRIPTION

Figure 1:
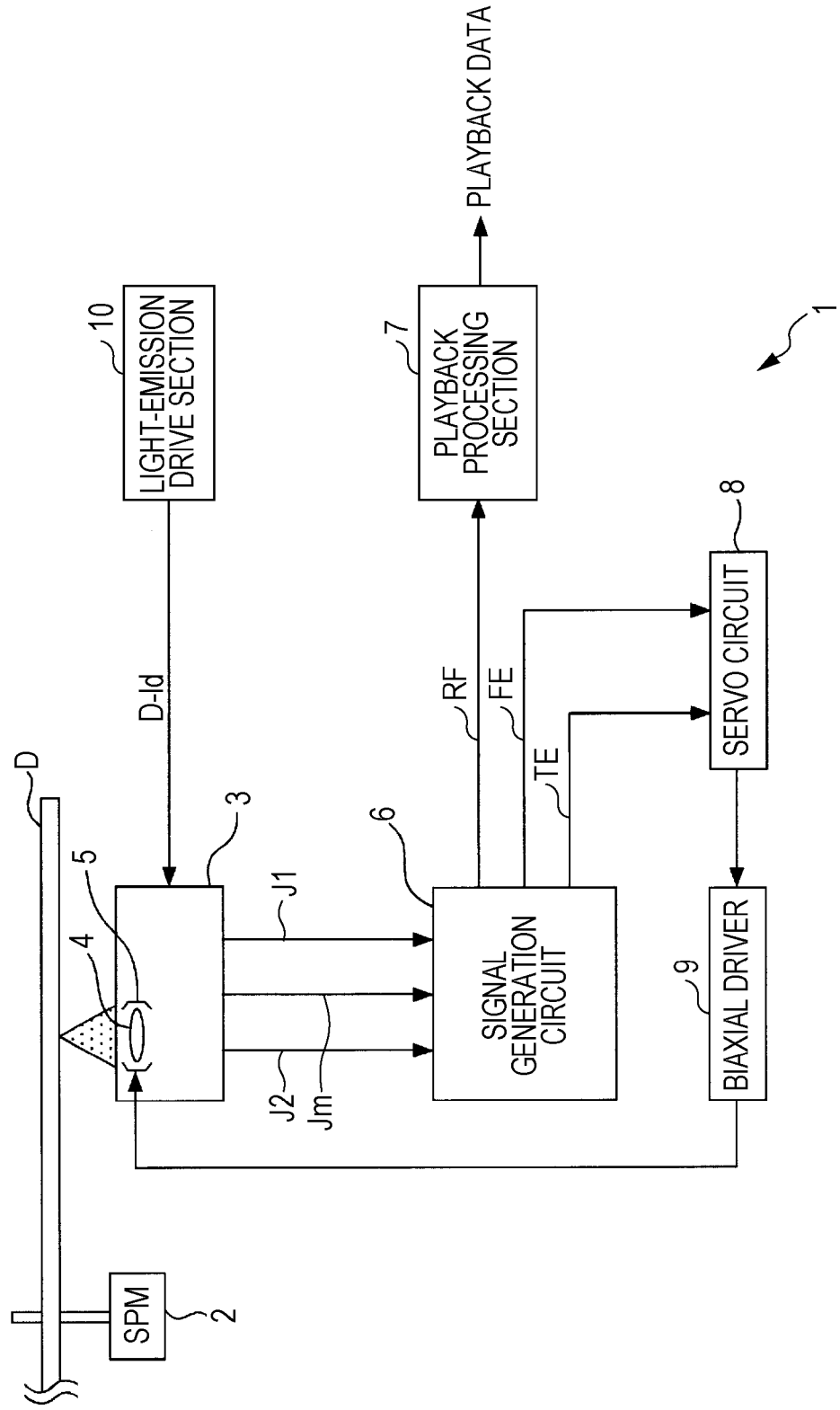
FIG. 1 is a diagram illustrating an internal configuration of an optical-recording-medium driving apparatus according to a first embodiment.

In the following, descriptions will be given of embodiments according to the present disclosure.

In this regard, the descriptions will be given in the following order.

1. First embodiment
1.1 Example of configuration of optical-recording-medium driving apparatus
1.2 Method of generating tracking error signal according to the embodiment
1.3 Simulation result
2. Second embodiment
3. Third embodiment
4. Variations 1. First Embodiment 1.1 Example of Configuration of Optical-Recording-Medium Driving Apparatus FIG. 1 is a diagram illustrating an internal configuration of an optical-recording-medium driving apparatus (hereinafter referred to as an optical disc drive 1) according to a first embodiment of the present disclosure.

First, an optical disc D in FIG. 1 is a disc-shaped optical recording medium (optical disc recording medium). Here, the optical recording medium means a recording medium on which information is recorded or reproduced by irradiating light.

In the present embodiment, it is assumed that a track is formed on the optical disc D by a pit string or a mark string such that a pitch is less than a theoretical resolution limitation. Here, the theoretical resolution limitation is defined by $\lambda/NA/2$ ($\lambda$=recording/reproducing wavelength, NA=objective lens numerical aperture).

When the optical disc D is loaded into the optical disc drive 1, the optical disc D is rotationally driven by a spindle motor (SPM) 2 in a state of a center hole clamped in accordance with a predetermined rotational control method. In the case of the first embodiment, it is assumed that a CLV (Constant Linear Velocity) method is employed for the rotational control method of the optical disc D.

The optical disc drive 1 is provided with an optical pickup 3 for irradiating laser light in order to record/reproduce information on the optical disc D that is rotationally driven, and to receive reflected light (returned light) of the laser light irradiated on the optical disc D.

A laser diode (a laser diode 11 described later) to be a light source of the laser light is disposed in the optical pickup 3.

Also, an objective lens 4 for condensing the laser light onto the optical disc D, and a biaxial actuator 5 for holding the objective lens 4 in a movable manner both in a closer direction to or an apart direction from the optical disc D (focus direction) and in a radial direction (tracking direction) are disposed in the optical pickup 3.

Also, a light receiving section (a light receiving section 14 described later) including a photodetector for receiving reflected light from the optical disc D through the objective lens 4 is disposed in the optical pickup 3.

In this regard, as described later, in the optical disc drive 1 in the present embodiment, the laser light is irradiated on the optical disc D so as to form at least three beam spots. Specifically, a first side spot Sp1, a main spot Mp, and a second side spot Sp2, described later, are individually formed.

In the optical pickup 3, the light receiving section 14 is configured so that the returned light is individually received for each of the spots. In FIG. 1, a light reception signal of the returned light from the first side spot Sp1, which is received by the optical pickup 3, is denoted by a light reception signal J1, a light reception signal of the returned light from the main spot Mp is denoted by a light reception signal Jm, and a light reception signal of the returned light from the second side spot Sp2 is denoted by a light reception signal J2.

In this regard, a further description will be given of the configuration for forming each of these spots and obtaining the individual light reception signals with reference to FIG. 2.

The laser diode disposed in the optical pickup 3 is light-emission driven on the basis of a drive signal D-ld output by a light-emission drive section 10 in FIG. 1.

Specifically, at the time of recording, the light-emission drive section 10 generates the drive signal D-ld in accordance with record data. And the light-emission drive section 10 light-emission drives the laser diode by the drive signal D-ld with record power so that recording on the optical disc D is performed.

Also, at the time of playback, the light-emission drive section 10 light-emission drives the laser diode by the drive signal D-ld with playback power so that information is read out from the optical disc D.

Each light reception signal (J1, Jm, and J2) obtained by the optical pickup 3 is supplied to the signal generation circuit 6.

The signal generation circuit 6 generates a necessary signal by predetermined calculation processing on the basis of the light reception signals J1, Jm, and J2.

For example, the signal generation circuit 6 generates a high frequency signal (playback data signal: hereinafter referred to as an RF signal) for obtaining playback data, a focus error signal FE for servo control, and a tracking error signal TE. Here, the focus error signal FE is a signal indicating an error of an in-focus position of the laser light on a recording surface (reflection surface) formed on the optical disc D. Also, the tracking error signal TE is a signal indicating a position error of an irradiation spot of the laser light on a track (a pit string or a mark string) formed on the recording surface in the tracking direction.

In this regard, a description will be given later of the signal generation circuit 6, in particular, a generation system of the tracking error signal TE with reference to FIG. 2.

The RF signal generated by the signal generation circuit 6 is supplied to a playback processing section 7. The playback processing section 7 performs playback processing, such as binarization processing and error correction processing, etc., on the RF signal, and obtains playback data.

In this regard, as described above, a track is formed on the optical disc D with a pitch less than a theoretical resolution limitation, and thus crosstalk from adjacent tracks arise at the time of signal playback. Thus, at the time of signal playback in this case, for example, crosstalk components of individual adjacent tracks ought to be eliminated from the RF signal generated from the light reception signal Jm for a main spot Mp using the signal read from the first side spot Sp1, and the signal read from the second side spot Sp2.

In this regard, the present disclosure is related to generation of a tracking error signal, and thus in order to avoid complication of explanation, a specific configuration of the playback system is omitted from the illustration.

The focus error signal FE and the tracking error signal TE that are generated by the signal generation circuit 6 are supplied to a servo circuit 8.

The servo circuit 8 performs servo control of focusing and tracking on the basis of the focus error signal FE and the tracking error signal TE.

Specifically, the servo circuit 8 generates a focus servo signal and a tracking servo signal on the basis of the focus error signal FE and the tracking error signal TE, respectively, and gives these signals to a biaxial driver 9. The biaxial driver 9 individually drives a focus coil and a tracking coil of the biaxial actuator 5 using a focus drive signal and a tracking drive signal generated on the basis of the focus servo signal and the tracking servo signal, respectively. Thereby, a focus servo loop and a tracking servo loop are individually formed through "the biaxial actuator 5→the signal generation circuit 6→the servo circuit 8→the biaxial driver 9→the biaxial actuator 5".

1.2 Method of Generating Tracking Error Signal According to the Embodiment

Figure 2:
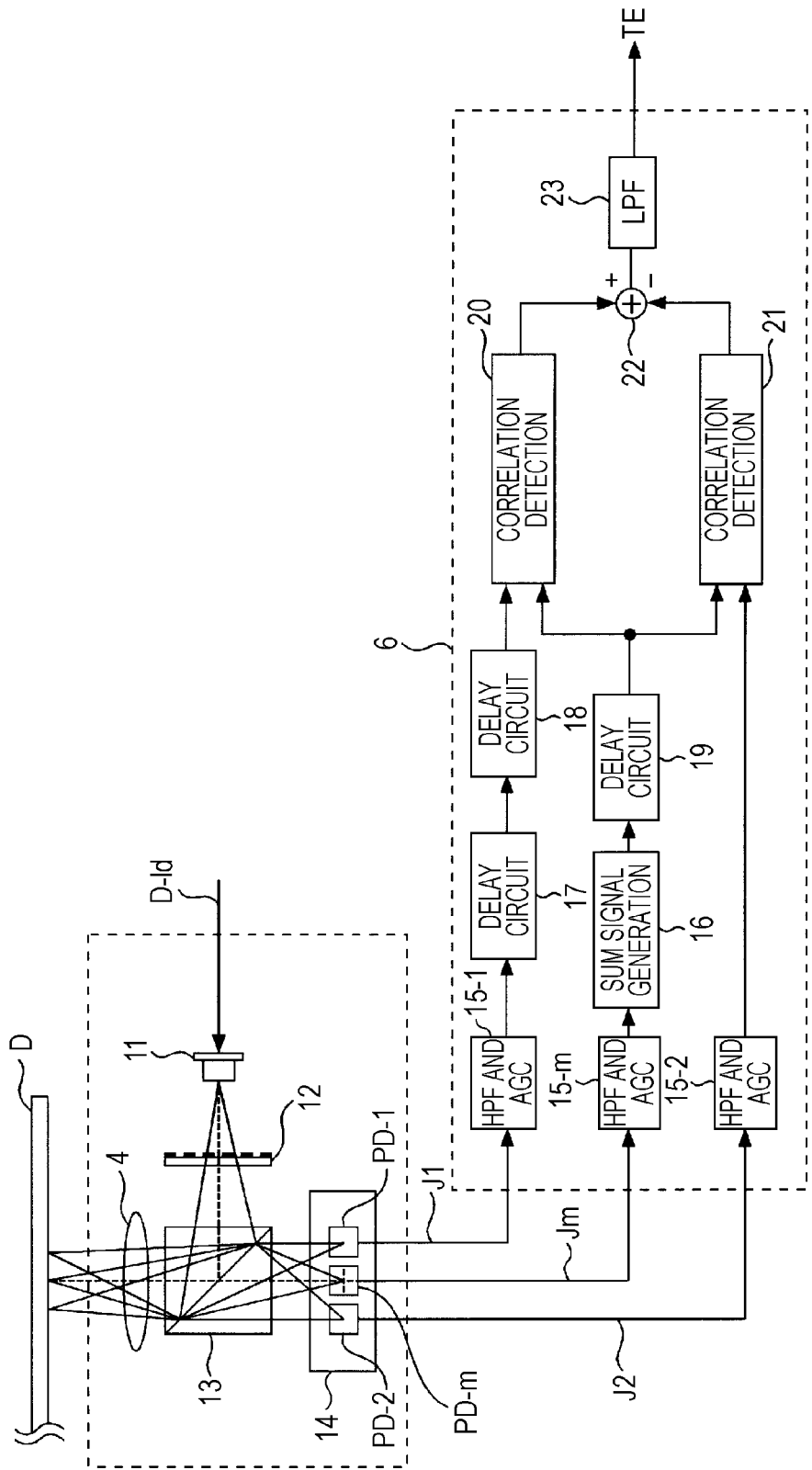
FIG. 2 is an explanatory diagram of an internal configuration of an optical-pickup and a signal-generation circuits included in the optical-recording-medium driving apparatus according to the first embodiment.

FIG. 2 illustrates an internal configuration of the optical pickup 3 and an internal configuration of the signal generation circuit 6, which are illustrated in FIG. 1.

In this regard, in FIG. 2, the internal configuration of the optical pickup 3 mainly illustrates a configuration for forming the three spots and a configuration for individually receiving returned light from each of those spots. Also, the internal configuration of the signal generation circuit 6 mainly illustrates a configuration of a generation system of the tracking error signal TE.

In the optical pickup 3, the laser diode 11 is light-emission driven on the basis of the drive signal D-ld from the above-described light-emission drive section 10.

The laser light emitted from the laser diode 11 goes through a grating 12, then is reflected by a beam splitter 13, and is led to the objective lens 4.

At this time, the laser light emitted from the laser diode 11 goes through the grating 12 so that the laser light goes through the objective lens 4, and is irradiated on the optical disc D so as to form the three spots as illustrated in FIG. 2.

Figure 3A:
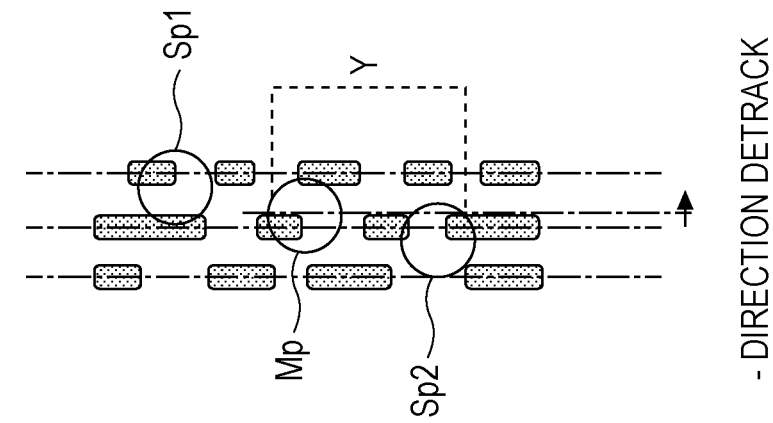
FIGS. 3A, 3B, and 3C are diagrams for explaining a tracking error signal according to the embodiment.
Figure 3B:
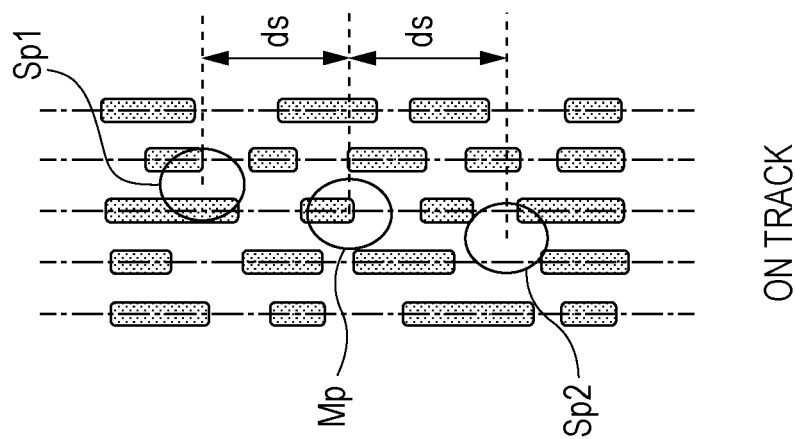

FIG. 3B illustrates positional relationships between the three spots formed on the optical disc D (recording surface) at this time.

By the grating 12 illustrated in FIG. 2, the three beam spots, namely, the first side spot Sp1, the main spot Mp, and the second side spot Sp2 are formed on the recording surface of the optical disc D as illustrated in FIG. 3B. The first side spot Sp1, the main spot Mp, and the second side spot Sp2 are disposed on the optical disc D so as to have positional relationships that are individually shifted in the tracking direction (in the lateral direction of the sheet) and the line direction (in the vertical direction of the sheet). Specifically, in this case, the main spot Mp has a positional relationship in which the main spot Mp is disposed in the middle of the three spots both in the tracking direction and in the line direction.

The first side spot Sp1 becomes a spot preceding the main spot Mp.

On the other hand, the second side spot Sp2 becomes a spot succeeding the main spot Mp.

Here, as illustrated in FIG. 3B, the amount of shift of the first side spot Sp1 and the second side spot Sp2 with respect to the main spot Mp in the line direction are both "ds", respectively.

Also, in this case, it is assumed that the amount of shift of the first side spot Sp1 and the second side spot Sp2 with respect to the main spot Mp in the tracking direction is a same amount, respectively. Specifically, in this case, it is also assumed that the amount of shift of the first side spot Sp1 and the second side spot Sp2 with respect to the main spot Mp in the tracking direction is a ½ track.

Here, FIG. 3B illustrates an arrangement relationship of each of the spots in a state in which a center of the main spot Mp matches a center of a track from which the main spot Mp is to be read (hereinafter referred to as an on-track state).

Referring back to FIG. 2, the returned light from the first side spot Sp1, the main spot Mp, and the second side spot Sp2 individually goes through the objective lens 4, and is transmitted through the beam splitter 13 to be condensed onto a light receiving surface of the light receiving section 14.

Here, a first photodetector PD-1, a main photodetector PD-m, and a second photodetector PD-2 are formed on the light receiving section 14. The first photodetector PD-1 is formed at a position capable of receiving the returned light from the first side spot Sp1. The main photodetector PD-m is formed at a position capable of receiving the returned light from the main spot Mp. Also, the second photodetector PD-2 is formed at a position capable of receiving the returned light from the second side spot Sp2.

As illustrated in FIG. 2, the main photodetector PD-m is assumed to be a quadrant detector. This is because the quadrant detector allows generating the focus error signal FE (for example, astigmatic method) on the basis of the light reception signal Jm of the main photodetector PD-m, and a push-pull signal, etc., as necessary.

In this regard, as far as generation of the tracking error signal TE (and the RF signal) according to the present embodiment is concerned, it is not necessary that the main photodetector PD-m is a quadrant detector.

Here, in FIG. 2, in order to avoid complexity of illustration, individual light reception signals from the main photodetector PD-m is included in the light reception signal Jm.

Next, a description will be given of the signal generation circuit 6.

As illustrated in FIG. 2, in the signal generation circuit 6, an HPF and AGC circuit 15-1 (HPF: High Pass Filter, AGC: Auto Gain Control), an HPF and AGC circuit 15-m, an HPF and AGC circuit 15-2, a sum-signal generation circuit 16, a delay circuit 17, a delay circuit 18, a delay circuit 19, a correlation detection section 20, a correlation detection section 21, a subtracter 22, and a LPF (Low Pass Filter) 23 are provided.

The light reception signal J1 from the first photodetector PD-1 in the light receiving section 14 is input to the HPF and AGC circuit 15-1. The light reception signal Jm from the main photodetector PD-m is input into the HPF and AGC circuit 15-*m*. The light reception signal J2 from the second photodetector PD-2 is input into the HPF and AGC circuit 15-2.

These HPF and AGC circuits 15 perform HPF processing on the input light reception signal for suppressing DC level variations, and perform gain adjustment on the basis of the AGC.

The light reception signal J1 having passed through the HPF and AGC circuit 15-1 goes through the delay circuit 17 and the delay circuit 18, and is input into the correlation detection section 20.

Also, The light reception signal Jm having passed through the HPF and AGC circuit 15-*m* is supplied to the sum-signal generation circuit 16 to produce a sum signal (a sum signal of four kinds of light reception signal), then goes through the delay circuit 19, and is input into the correlation detection section 20 and the correlation detection section 21.

Also, the light reception signal J2 having passed through the HPF and AGC circuit 15-2 is input into the correlation detection section 21.

In this regard, the disposition of the HPF and AGC circuit 15-*m* and the sum-signal generation circuit 16 may be replaced, and thus it is possible to configure to generate a sum signal, and then to perform the HPF and AGC.

Here, a delay time (an amount of delay) in accordance with the spot interval ds, illustrated in FIG. 3B, is set in the delay circuit 17, the delay circuit 18, and the delay circuit 19. Specifically, a time period necessary for the spot to proceed for the spot interval ds is set as the delay time.

FIG. 4 is an explanatory diagram on action obtained by the setting of such a delay time.

In this regard, in FIG. 4, an arrow L denotes a direction in which each spot proceeds with rotation of the optical disc D.

By setting of the above-described delay time, same action as that of aligning positions of the preceding main spot Mp and first side spot Sp1 in the line direction with a position of the most succeeding second side spot Sp2. That is to say, the same action is obtained as that obtained by correcting the time differences that individually arise with the light reception signal J1, and the light reception signal Jm (sum signal) on the basis of the light reception signal J2.

In FIG. 2, the correlation detection section 20 calculates a first correlation value representing a correlation between the light reception signal J1 (hereinafter denoted by a delayed light reception signal J1) whose time difference has been corrected by the delay circuit 17 and the delay circuit 18, and a sum signal (hereinafter denoted by a delayed light reception signal Jm) of the light reception signal Jm whose time difference has been corrected by the delay circuit 19.

Also, the correlation detection section 21 calculates a second correlation value representing a correlation between the delayed light reception signal Jm and the light reception signal J2 (hereinafter simply denoted by a light reception signal J2) having passed through the HPF and AGC circuit 15-2.

Specifically, in this embodiment, the correlation detection section 20 calculates a square value of the difference between the delayed light reception signal J1 and the delayed light reception signal Jm as the first correlation value.

In the same manner, the correlation detection section 21 calculates a square value of the difference between the delayed light reception signal Jm and the light reception signal J2 as the second correlation value.

The subtracter 22 calculates the difference between the first correlation value and the second correlation value. Specifically, in this case, "the first correlation value—the second correlation value".

The difference value (difference signal) obtained by the subtracter 22 is subjected to elimination of components having a frequency of a predetermined cutoff frequency or higher by the LPF 23.

In this manner, the difference signal having passed through the LPF 23 is output from the signal generation circuit 6 as the tracking error signal TE.

Here, a description will be given of the tracking error signal TE generated by the signal generation circuit 6 described above with reference to the preceding FIG. 3B, FIG. 3A, and FIG. 3C.

Figure 3C:
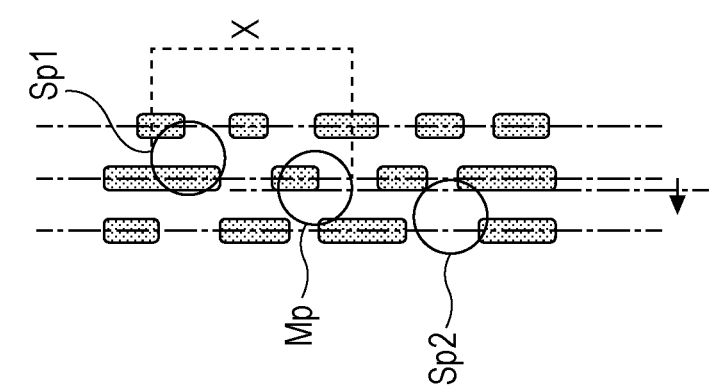

In this regard, FIG. 3A illustrates a state in which detrack arises on the side on which the second side spot Sp2 is disposed (assumed to be a + direction). FIG. 3C illustrates a state in which detrack arises on the side on which the first side spot Sp1 is disposed (assumed to be a − direction).

First, in an on-track state illustrated in FIG. 3B, with respect to a track from which the main spot Mp is read (track to be a target of tracking servo), distances from the first side spot Sp1 and from the second side spot Sp2 in the tracking direction, respectively, are the same. Accordingly, a first correlation value indicating a correlation between the delayed light reception signal J1 and the delayed light reception signal Jm, and a second correlation value indicating a correlation between the delayed light reception signal Jm and the light reception signal J2 have a same value. That is to say, the value of the tracking error signal TE, which is a difference of these correlation values, is "0".

On the other hand, for example, if detrack arises in the + direction as illustrated in FIG. 3A, the first side spot Sp1 comes close to a track from which the main spot Mp is read, a correlation between the delayed light reception signal J1 and the delayed light reception signal Jm becomes high (an "X" pair in FIG. 3A). At the same time, the second side spot Sp2 goes away from a track from which the main spot Mp is read, and thus a correlation between the delayed light reception signal J2 and the delayed light reception signal Jm becomes low.

At this time, the correlation value is calculated by a square value of the difference, and thus if the correlation is high, the calculated correlation value becomes low. Accordingly, at the time of detrack in the + direction as described above, the first correlation value can be low, and the second correlation value can be expressed as high. As a result, a value of the tracking error signal TE at the time of detrack in the + direction (=the first correlation value−the second correlation value) becomes a negative value (assumed to be −n).

On the other hand, if detrack arises in the − direction as illustrated in FIG. 3C, the second side spot Sp2 comes closer to a track from which the main spot Mp is read, the correlation between the light reception signal J2 and the delayed light reception signal Jm becomes higher (a "Y" pair in FIG. 3C), and thus, on the contrary, the correlation between the delayed light reception signal J1 and the delayed light reception signal Jm becomes low.

Accordingly, at the time of detrack in the − direction, the first correlation value becomes high, and the second correlation value becomes low. As a result, a value of the tracking error signal TE becomes a positive value (assumed to be n).

As is understood from the above description, the tracking error signal TE according to the present embodiment properly indicates the amount of detrack occurrence and a direction thereof in accordance with an optical disc D having a track pitch less than a theoretical resolution limitation. That is to say, it is possible to perform tracking servo control properly even if a track pitch is set to a value less than a theoretical resolution limitation.

Here, as is understood with reference to FIG. 2, in order to generate the tracking error signal TE according to the present embodiment, it is necessary to provide at least a configuration to form three spots and to individually receive returned light therefrom, and a circuit section to perform simple processing, such as delay, multiplication, and subtraction, on the light reception signal. That is to say, it is not necessary to have a special optical system and complicated calculation in order to generate the tracking error signal TE.

As is understood from the above, according to the present embodiment, it is possible to provide a configuration allowing proper tracking servo control easily and at low cost even if a track pitch is set to a value less than a theoretical resolution limitation.

1.3 Simulation Result

Figure 6:
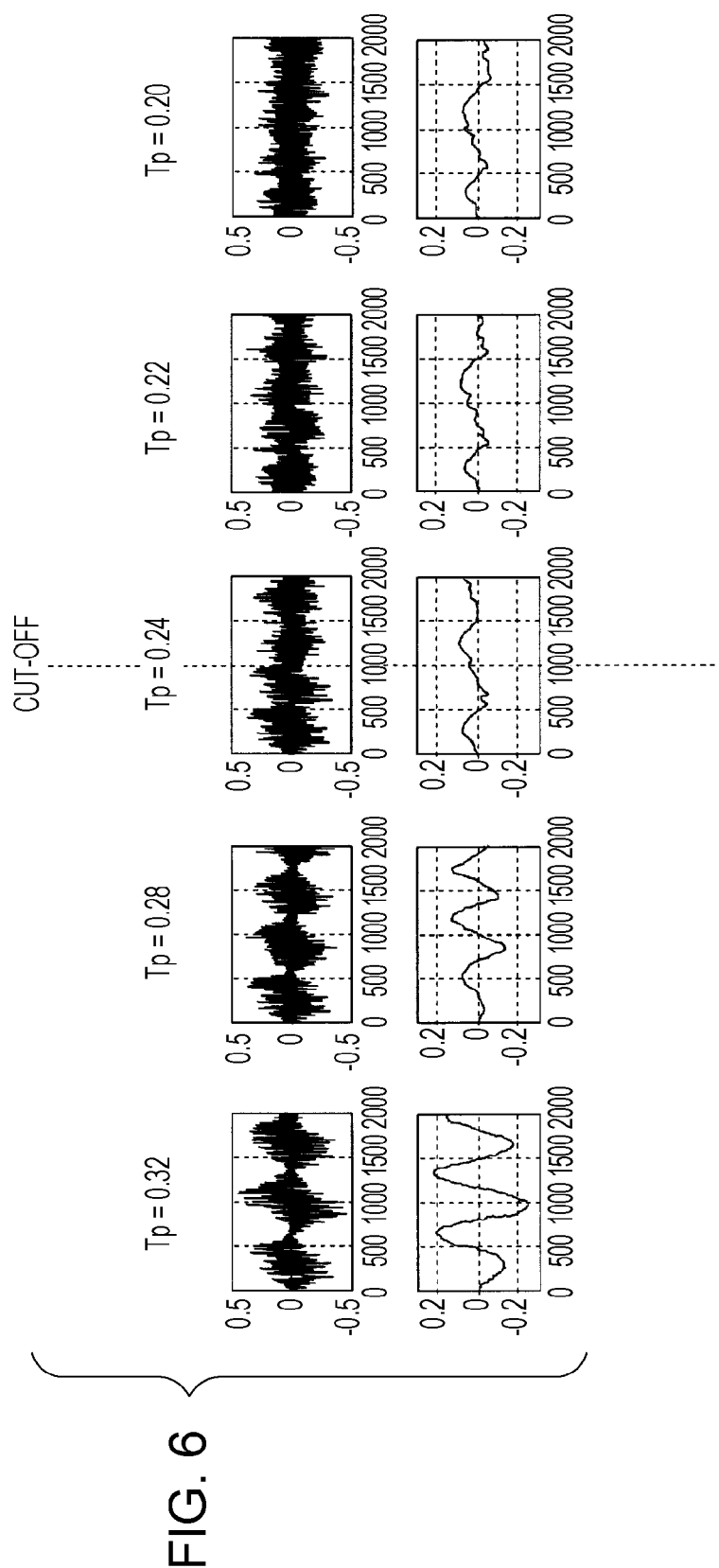
FIG. 6 is a diagram illustrating waveforms of a tracking error signal by a push-pull method for each track pitch.

FIGS. 5A, 5B and 6 illustrate simulation results in order to verify effectiveness of a method of generating a tracking error signal according to the present embodiment.

FIG. 5A and FIG. 5B illustrate waveforms obtained, for each track pitch, of a tracking error signal TE according to the present embodiment, and a tracking error signal by a DPD (Differential Phase Detection) method, respectively, in comparison.

Also, FIG. 6 illustrates waveforms obtained, for each track pitch, of a tracking error signal by a push-pull method.

In this regard, in FIGS. 5A, 5B, and 6, a track pitch (Tp) is individually set to Tp=0.32 μm, Tp=0.28 μm, Tp=0.24 μm, Tp=0.22 μm, and Tp=0.20 μm.

In the simulation, a wavelength λ=405 nm, a numerical aperture of objective lens 4 NA=0.85. Accordingly, a theoretical resolution limitation (denoted by "cut-off" in FIG. 5 and FIG. 6) is about 0.24 μm.

Also, in FIGS. 5A, 5B, and 6, an upper part illustrates a waveform before the LPF processing, and a lower part illustrates a waveform after the LPF processing.

Referring to FIG. 5B, in the case of a tracking error signal by the DPD method, it is possible to confirm that a proper waveform is kept as far as Tp=0.28 μm, but a relatively large disturbance occurs at Tp=0.24 μm or less, which is a theoretical resolution limitation.

Also, in FIG. 6, in the case of a tracking error signal by the push-pull method, it is possible to confirm that Tp=0.28 μm is substantially a limit of proper tracking error detection.

In this manner, in both the DPD method and the push-pull method, it is very difficult to detect a tracking error when a track pitch is less than a theoretical resolution limitation.

In contrast, by a tracking error signal TE according to the present embodiment, illustrated in FIG. 5A, it is possible to confirm that a proper waveform is obtained even if Tp=0.22 μm. As is apparent from this, by the present embodiment, it is possible to perform tracking error detection properly under the setting of a track pitch that is less that the theoretical resolution limitation.

2. Second Embodiment

Figure 7:
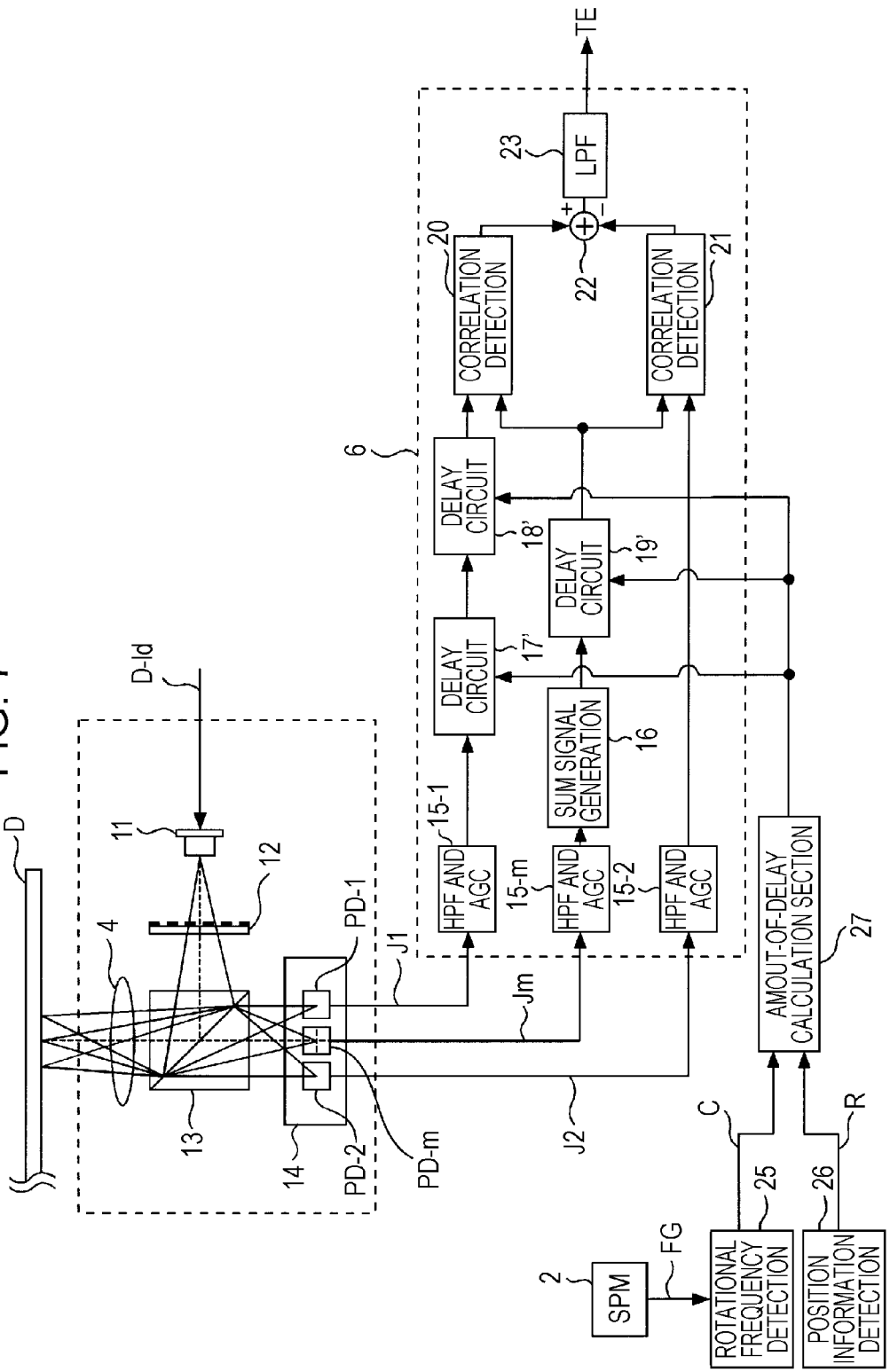
FIG. 7 is an explanatory diagram of a configuration of an optical-recording-medium driving apparatus according to a second embodiment.

FIG. 7 is an explanatory diagram illustrating a configuration of an optical-recording-medium driving apparatus (assumed to be an optical disc drive 30) according to a second embodiment.

In FIG. 7, as for a configuration other than the optical pickup 3, parts that are different from the optical disc drive 1 according to the first embodiment are mainly illustrated, and the other configuration (for example, the servo circuit 8, etc.) are omitted from the illustration.

In this regard, in FIG. 7, a same reference numeral is attached to a part that is the same part described before, and the description thereof will be omitted.

Also, in the second embodiment, the signal generation circuit 6 also generates the RF signal and the focus error signal FE, but in the same manner as FIG. 2, the configuration for those functions are also omitted from the illustration in this case.

In the second embodiment, an amount of delay is set variable in order to support the case where a CAV (Constant Angular Velocity) method is employed as a rotational control method of the optical disc D.

Specifically, the optical disc drive 30 in this case is provided with a rotational-frequency detection section 25, a position-information detection section 26, and an amount-of-delay calculation section 27.

Also, the signal generation circuit 6 is provided with a delay circuit 17', a delay circuit 18', and a delay circuit 19' in place of the delay circuit 17, the delay circuit 18, and the delay circuit 19, respectively. The delay circuits 17' to 19' are different from the delay circuits 17 to 19, respectively, in the point that an amount of delay is set changeable.

The rotational-frequency detection section 25 detects a rotational frequency C of the optical disc D on the basis of an FG pulse from an FG (Frequency Generator) motor included in the spindle motor 2.

Also, the position-information detection section 26 detects a playback radius position R of the optical disc D. The position-information detection section 26 includes, for example, a sensor for detecting a slide position (a radial direction position) of the optical pickup 3, and detects the playback radius position R on the basis of a detection result of the sensor.

Alternatively, if it is possible to detect radial position information recorded on the optical disc D on the basis of a light reception signal of the returned light from the optical disc D, the detection information ought to be used for the playback radius position R.

The amount-of-delay calculation section 27 calculates a corresponding amount of delay dt on the basis of information on the rotational frequency C, the playback radius position R, and the spot interval ds illustrated in FIG. 3B.

Specifically, the amount-of-delay calculation section 27 calculates an amount of delay dt as follows.

$$dt=ds/2\pi RC$$

The amount of delay dt calculated by the amount-of-delay calculation section 27 is supplied to the delay circuit 17', the delay circuit 18', and the delay circuit 19'. The delay circuits 17' to 19' delay input signals in accordance with a value of the supplied amount of delay dt, respectively.

With such a configuration, even in the case where a CAV method is employed, and a line speed changes from an inner circumference to an outer circumference of the optical disc D, it is possible to delay the light reception signals J1 and Jm using a proper amount of delay dt that is capable of correcting time differences with respect to the light reception signal J2. That is to say, in the case of employing a CAV method, it is possible to generate a proper tracking error signal TE.

In this regard, for confirmation, the above-described configuration has no problem when applied to a case of employing a CLV method.

Also, by the above-described configuration, it becomes possible to properly correct time differences of the light reception signals in the case where the playback speed is changed to double speed/four-times speed/six-times speed, etc.

In this regard, in the case of employing a CLV method, in order to support a change in the playback speed as described above, the amount-of-delay calculation section 27 (also the rotational-frequency detection section 25, and the position-information detection section 26) ought not to be provided. Alternatively, a configuration ought to be provided in order to change values corresponding to the amounts of delay dt to be set in the delay circuits 17' to 19' in accordance with a change in the playback speed, respectively.

Specifically, for example, a configuration in which a value corresponding to an amount of delay dt is set for each applicable playback speed is set in advance, and amounts of delay dt corresponding to the playback speed after the change are set in the delay circuits 17' to 19' in response to speed change time.

Alternatively, it is possible to employ a configuration in which only an amount of delay dt corresponding to a reference playback speed (for example, a normal speed) is set as an amount of delay dt, and amounts of delay dt produced by multiplying the set playback speed and coefficients are set in the delay circuits 17' to 19'.

3. Third Embodiment

Here, by the descriptions so far, a method of obtaining a tracking error signal TE has been exemplified as follows. As a method of generating a tracking error signal on the basis of the correlation between the light reception signal of the first side spot and the light reception signal of the main spot, and the correlation between the light reception signal of the second side spot and the light reception signal of the main spot, the correlation value (first correlation value) between the first side spot and the main spot, and the correlation value (second correlation value) between the second side spot and the main spot are calculated, and then the difference between the first correlation value and the second correlation value is calculated to obtain the tracking error signal TE.

However, a method of generating a tracking error signal according to the present disclosure is not limited to the above-described method, and, for example, it is possible to employ methods described as follows.

Figure 8:
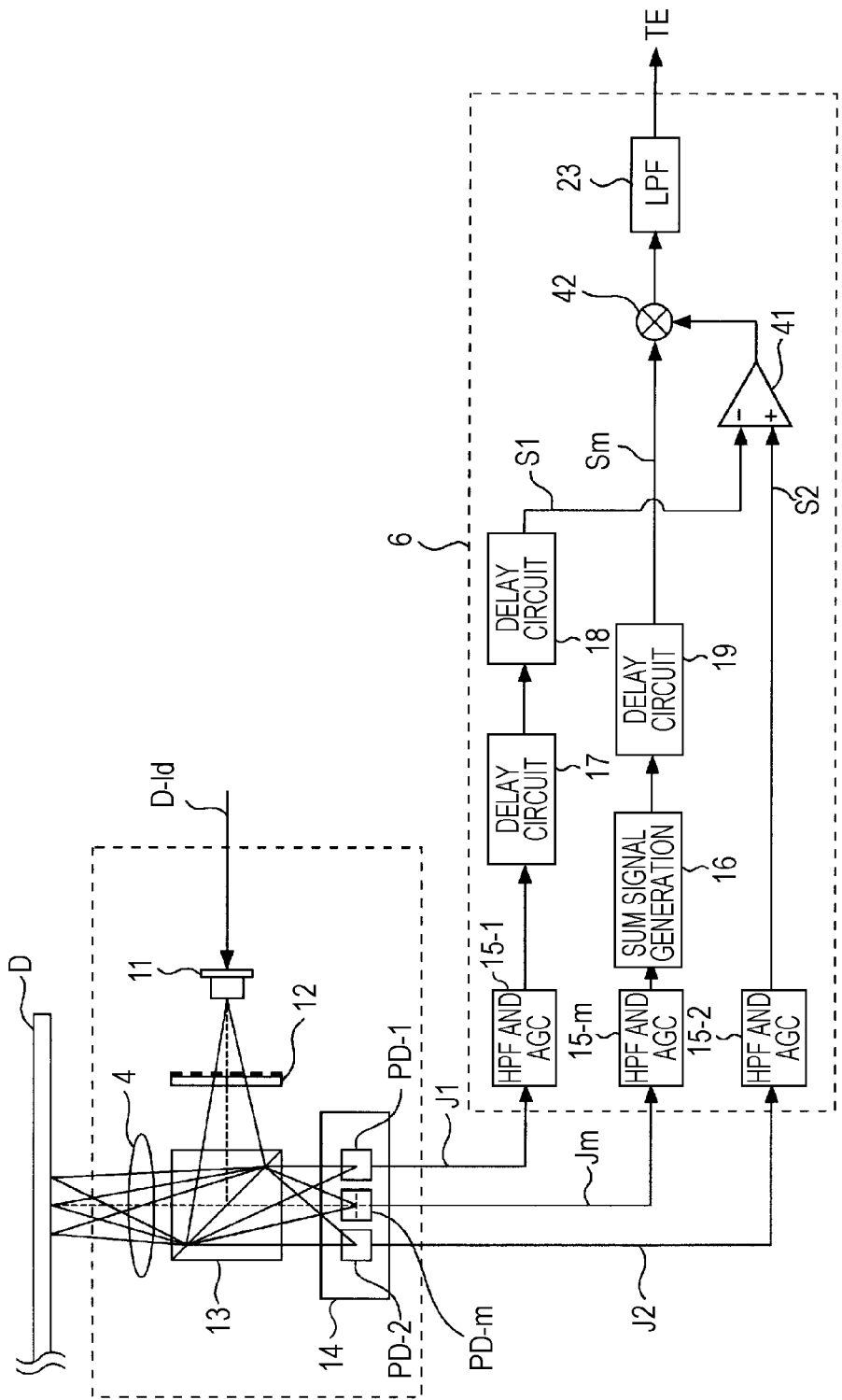
FIG. 8 is an explanatory diagram of a configuration of an optical-recording-medium driving apparatus according to a third embodiment.

FIG. 8 is an explanatory diagram of a configuration of an optical-recording-medium driving apparatus (assumed to be an optical disc drive 40) according to a third embodiment.

In this regard, in FIG. 8, as for a configuration other than the optical pickup 3, parts that are different from the optical disc drive 1 according to the first embodiment are mainly illustrated, and the other configuration (for example, the servo circuit 8, etc.) is omitted from the illustration.

Also, in this case, in FIG. 8, a same reference numeral is attached to a part that is the same part described before, and the description thereof will be omitted.

Also, in the third embodiment, the signal generation circuit 6 also generates the RF signal and the focus error signal FE, but in the same manner as FIG. 2, the configuration for those functions are also omitted from the illustration in this case.

As is understood by comparing with FIG. 2, the optical disc drive 40 according to the third embodiment is different from the optical disc drive 1 according to the first embodiment in points that the correlation detection sections 20 and 21 and the subtracter 22 are omitted, and a comparator (subtracter) 41 and a multiplication section 42 are disposed in the signal generation circuit 6.

Here, the light reception signal J1 of the first side spot Sp1, which has been delayed by the delay circuits 17 and 18, is assumed to be a signal S1. Also, the light reception signal Jm (sum signal) of the main spot Mp, which has been delayed by the delay circuit 19, is assumed to be a signal Sm, and the light reception signal J2 of the second side spot Sp2 passing through the HPF and AGC 15-2 is assumed to be a signal S2. The comparator 41 receives input of the signal S1 and the signal S2, and outputs the difference signal between these signals. Specifically, in the present embodiment, the difference signal by "S2−S1" is output.

The multiplication section 42 multiplies the difference signal output from the comparator 41 by the signal Sm. That is to say, in the case of the present embodiment, "(S2−S1)×Sm" is calculated.

As illustrated in FIG. 8, the output signal (multiplication result) from the multiplication section 42 is output as the tracking error signal TE through the LPF 23.

Here, the calculation in the above-described configuration is equivalent to calculating the difference between "S1×Sm" and "S2×Sm". To put it in another way, the calculation in the configuration is equivalent to calculating the difference between the correlation between the light reception signal of the first side spot and the light reception signal of the main spot, and the correlation between the light reception signal of the second side spot and the light reception signal of the main spot.

Accordingly, by the third embodiment, a tracking error signal is generated on the basis of the correlation between the light reception signal of the first side spot and the light reception signal of the main spot, and the correlation between the light reception signal of the second side spot and the light reception signal of the main spot in the same manner.

As is understood from the above, according to the third embodiment, in the same manner as in the case of the first embodiment, it becomes possible to provide a configuration allowing tracking servo control easily and at low cost even if a track pitch is set to a value less than a theoretical resolution limitation.

In this regard, as a result of comparison of the third embodiment with a DPD method and a push-pull method, a same simulation result is obtained as that of FIG. 5 and FIG. 6.

Also, as is understood by comparing with the configuration in FIG. 2, by the third embodiment, it is possible to make a configuration for generating a tracking error signal easier (and more inexpensively) than the first embodiment.

4. Variations

In the above, descriptions have been given of the embodiments according to the present disclosure. However, the present disclosure is not limited to the specific examples described so far. For example, in the above description, the difference signal between the first correlation value and the second correlation value, or the signal by "(S2−S1)×Sm" is subjected to the LPF processing, and then is supplied to the servo circuit 8 as the tracking error signal TE. However, normally a band of the biaxial actuator 5 is sufficiently low with respect to a band of an RF signal (readout signal), and thus if the difference signal or the signal by "(S2−S1)×Sm" is directly output, a same result is obtained as in the case of inserting the LPF 23 as a result. That is to say, in this sense, the LPF 23 is not a necessary component in the present disclosure.

Also, in the first embodiment, for the first and the second correlation values, the square value of the difference between the individual light reception signals is calculated. In place of the square value of the difference, an absolute value of the difference may be calculated. Alternatively, multiplication of the individual light reception signals may be used.

In the present disclosure, the first correlation value and the second correlation value may be calculated so as to express the correlation between the individual light reception signals, and should not be limited to the above exemplified cases.

Also, in the explanations so far, descriptions have been given of the cases where disposition intervals between the first side spot Sp1 and the main spot Mp, and between the main spot Mp and the second side spot Sp2 in the tracking direction are assumed to be a ½ track, respectively. However, the disposition intervals between the individual spots in the tracking direction ought to be set in a range that allows a tracking error signal TE generated by the above-described calculation method to represent a detrack direction and an amount of detrack occurrence. Accordingly, the disposition interval should not be limited to a ½ track.

Also, in the present disclosure, it is also possible to employ configurations described as follows.

(1) An optical-recording-medium driving apparatus including:

a light irradiating/receiving section configured to irradiate light on an optical recording medium so as to form a first side spot, a main spot, and a second side spot disposed in a positional relationship individually shifted both in a tracking direction and a line direction of the optical recording medium, and to receive reflection light from the optical recording medium individually on each of the spots;

a first delay section configured to delay a light reception signal on the first side spot, obtained by the light irradiating/receiving section, for a time period in accordance with a disposition interval between the first side spot and the second side spot in the line direction;

a second delay section configured to delay a light reception signal on the main spot, obtained by the light irradiating/receiving section, for a time period in accordance with a disposition interval between the main spot and the second side spot in the line direction; and a tracking-error-signal generation section configured to generate a tracking error signal on the basis of a correlation between a light reception signal delayed by the first delay section on the first side spot and a light reception signal delayed by the second delay section on the main spot, and a correlation between a light reception signal on the second side spot, obtained by the light irradiating/receiving section, and a light reception signal delayed by the second delay section on the main spot.

(2) The optical-recording-medium driving apparatus according to (1), wherein the tracking-error-signal generation section obtains the tracking error signal by calculating a difference between a value representing a correlation between the light reception signal delayed by the first delay section on the first side spot and the light reception signal delayed by the second delay section on the main spot, and a value representing a correlation between the light reception signal on the second side spot and the light reception signal delayed by the second delay section on the main spot.

(3) The optical-recording-medium driving apparatus according to (2), wherein the tracking-error-signal generation section calculates a first correlation value representing a correlation between the light reception signal delayed by the first delay section on the first side spot and the light reception signal delayed by the second delay section on the main spot, calculates a second correlation value representing a correlation between the light reception signal on the second side spot and the light reception signal delayed by the second delay section on the main spot, and calculates a difference between the first correlation value and the second correlation value to obtain the tracking error signal.

(4) The optical-recording-medium driving apparatus according to (3), wherein the tracking-error-signal generation section calculates the first correlation value on the basis of the difference between the light reception signal delayed by the first delay section on the first side spot and the light reception signal delayed by the second delay section on the main spot, and calculates the second correlation value on the basis of the difference between the light reception signal delayed by the second delay section on the main spot and the light reception signal on the second side spot.

(5) The optical-recording-medium driving apparatus according to (2), wherein the tracking-error-signal generation section multiplies the difference between the light reception signal delayed by the first delay section on the first side spot and the light reception signal on the second side spot by the light reception signal delayed by the second delay section on the main spot in order to obtain the tracking error signal.

(6) The optical-recording-medium driving apparatus according to any one of (1) to (5), further including an amount-of-delay changing control section configured to perform changing control of an amount of delay by the first delay section and the second delay section in accordance with a change of playback speed of the optical recording medium.

(7) The optical-recording-medium driving apparatus according to any one of (1) to (6), further including:

a rotational-frequency detection section configured to detect a rotational frequency of the optical recording medium;

a radius-position detection section configured to detect a playback radius position on the optical recording medium; and an amount-of-delay calculation section configured to calculate amounts of delay to be set in the first delay section and the second delay section on the basis of information on disposition intervals between the individual spots in the line direction.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An optical-recording-medium driving apparatus comprising:

a light irradiating and/or receiving section configured to irradiate light on an optical recording medium so as to form a first side spot, a main spot, and a second side spot disposed in positional relationships individually shifted both in a tracking direction and a line direction of the optical recording medium, and to receive reflection light from the optical recording medium individually on each of the spots; and a signal generation circuit configured to generate a tracking-error-signal which is supplied to a servo circuit to perform servo control of tracking on the basis of the tracking error signal, wherein the signal generation circuit comprises:
  a first delay section configured to delay a first light reception signal obtained by a first photodetector in the light irradiating and/or receiving section, for a first time period in accordance with a first disposition interval between the first side spot and the second side spot in the line direction;
  a second delay section configured to delay a second light reception signal obtained by a second photodetector in the light irradiating and/or receiving section, for a second time period in accordance with a second disposition interval between the main spot and the second side spot in the line direction; and
  a tracking-error-signal generation section configured to generate the tracking error signal by calculating a difference value between a square of a first correlation and a square of a second correlation, wherein the first correlation is between the first light reception signal delayed by the first delay section and the second light reception signal delayed by the second delay section, and wherein the second correlation is between the second light reception signal delayed by the second delay section and a third light reception signal obtained by a third photodetector in the light irradiating and/or receiving section.

2. The optical-recording-medium driving apparatus according to claim 1, wherein the tracking-error-signal generation section calculates the first correlation on the basis of a difference between the first light reception signal delayed by the first delay section and the second light reception signal delayed by the second delay section, and calculates the second correlation on the basis of a difference between the second light reception signal delayed by the second delay section and the third light reception signal.

3. The optical-recording-medium driving apparatus according to claim 1, further comprising an amount-of-delay changing control section configured to perform changing control of an amount of delay by the first delay section and the second delay section in accordance with a change of playback speed of the optical recording medium.

4. The optical-recording-medium driving apparatus according to claim 1, further comprising:
  a rotational-frequency detection section configured to detect a rotational frequency of the optical recording medium;
  a radius-position detection section configured to detect a playback radius position on the optical recording medium; and
  an amount-of-delay calculation section configured to calculate amounts of delay to be set in the first delay section and the second delay section on the basis of information on disposition intervals among the first side spot, the main spot, and the second side spot in the line direction.

5. The optical-recording-medium driving apparatus according to claim 1, wherein the signal generation circuit is further configured to generate a focus error signal which is supplied to the servo circuit to perform servo control of focusing on the basis of the focus error signal.

6. A method of generating a tracking error signal in an optical-recording-medium apparatus, the method comprising:
  irradiating light on an optical recording medium by a light irradiating and/or receiving section so as to form a first side spot, a main spot, and a second side spot disposed in positional relationships individually shifted both in a tracking direction and a line direction of an optical recording medium;
  delaying a first light reception signal obtained by a first photodetector in the light irradiating and/or receiving section of a signal generation circuit, for a first time period in accordance with a first disposition interval between the first side spot and the second side spot in the line direction;
  delaying a second light reception signal obtained by a second photodetector in the light irradiating and/or receiving section, for a second time period in accordance with a second disposition interval between the main spot and the second side spot in the line direction; and
  generating a tracking error signal by a tracking-error-signal generation section of the signal generation circuit by calculating a difference value between a square of a first correlation and a square of a second correlation, wherein the first correlation is between the first light reception signal delayed by a first delay section and the second light reception signal delayed by a second delay section, and wherein the second correlation is between the second light reception signal delayed by the second delay section and a third light reception signal obtained by a third photodetector in the light irradiating and/or receiving section.

* * * * *